May 13, 1969     L. B. LEONARD ET AL     3,444,068

ELECTRODE AND METHOD OF MAKING SAME

Filed Jan. 3, 1966

INVENTORS
LYNN B. LEONARD
ARNE J. PETERSEN
BY
*Thomas L. Peterson*

ATTORNEY

INVENTORS
LYNN B. LEONARD
ARNE J. PETERSEN
BY
ATTORNEY

United States Patent Office 3,444,068
Patented May 13, 1969

3,444,068
ELECTRODE AND METHOD OF MAKING SAME
Lynn B. Leonard, Fullerton, and Arne J. Petersen, Balboa, Calif., assignors to Beckman Instruments, Inc., a corporation of California
Filed Jan. 3, 1966, Ser. No. 518,278
Int. Cl. B01k 3/06
U.S. Cl. 204—195          5 Claims

ABSTRACT OF THE DISCLOSURE

A glass electrode structure and method for making the same in which a single glass ring seals together the ends of inner and outer concentric glass tubes and an ion sensitive glass bulb. The ring is formed in a single step by applying a gob of molten ion sensitive glass to spaced apart ends of the two glass tubes to fill the annular passage therebetween and form a droplet of the ion sensitive glass across the inner tube. Air is blown through the inner tube to form a bulb of ion sensitive glass from the droplet.

---

This invention relates generally to electrochemical electrodes and, more particularly, to the forming of a glass seal and an ion sensitive bulb for a glass electrode assembly.

A glass electrode normally comprises a glass tube with a blown bulb of ion sensitive glass at one end thereof. The bulb is sealed to the stem directly or with an intermediate or grade glass therebetween. An internal half-cell is positioned in the tube and is immersed in an electrolyte solution contacting the inner surface of the bulb.

On occasion, it is desired to have the stem of the electrode formed of inner and outer concentric glass tubes with the ion sensitive bulb formed at the one end of the tubes. For example, such an arrangement is desirable in the construction of combination glass-reference electrodes wherein the outer tube contains an electrolyte in which there is immersed an internal half-cell and there is provided a liquid junction structure in the outer tube for the flow of the electrolyte to the sample, as well known in the art. In making this type of electrode, it has been the practice to seal the lower portion of the outer tube to the inner tube by a glass ring seal spaced a short distance behind the end of the inner tube. Thereafter, the glass ring seal must be reheated prior to forming the bulb on the end of the inner glass tube in order to prevent strains from occurring at the ring seal. Thus, in the present method of attaching the bulb to a double tube glass assembly, three steps are required, namely, the forming of a glass ring seal between the inner and outer tubes at one end thereof, the subsequent reheating of the glass ring seal and, thereafter, the forming of a bulb on the end of the inner glass tube. Besides being time consuming and requiring substantial skill to produce, this construction has the disadvantage that the ion sensitive bulb is spaced from the bottom of the outer tube so that when a liquid junction structure is provided in the outer tube, it is likewise spaced a substantial distance from the ion sensitive bulb, which is not desirable.

It is, therefore, the principal object of the present invention to provide a simple and economical method for forming an ion sensitive bulb on the end of a double glass tube assembly.

Another object of the invention is to provide a glass electrode in which the ion sensitive bulb is attached essentially directly to a glass ring between an inner and outer glass tube assembly.

According to a principal aspect of the present invention, an ion sensitive bulb is formed at the end of a double glass tube assembly by positioning the ends of the tube so that a small annular passage is provided between the tube ends and applying a batch of molten ion sensitive glass to the tube ends to fill the passage with a glass ring and form a droplet of the ion sensitive glass across the inner tube. Thereafter, air is blown through the other end of the inner tube to form a bulb of ion sensitive glass from said droplet. Thus by this method there is formed in one step a glass ring which seals the ends of the inner and outer tubes and seals an ion sensitive bulb to the tube assembly. Hence, no heating of glass ring seals near the end of the inner tube to which the bulb is formed is required as in the present practice of making combination glass-reference electrodes and a minimum of time and skill is required to seal the bulb to the tubes in accordance with the invention in contrast to the prior methods. In addition, by the method of the present invention the resulting glass electrode construction has the ion sensitive bulb depending directly from the ring joining the ends of the inner and outer tubes, which construction has not been shown in the prior art and has several advantages which will appear later.

Other objects, aspects and advantages will become apparent from the following description taken in connection with the accompanying drawings wherein.

Figure 1:
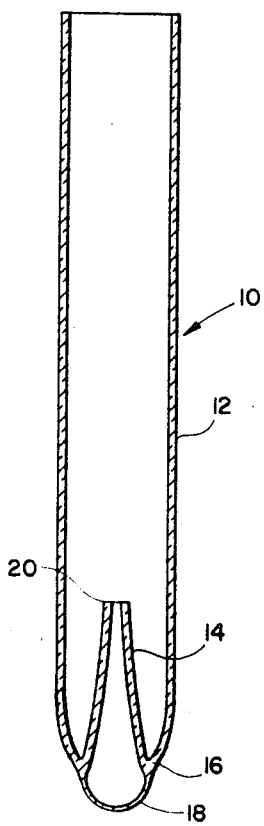
FIG. 1 is a longitudinal sectional view of a shell for one embodiment of the electrochemical electrode assembly of the invention.

Referring now to the drawings in detail, wherein like reference characters designate like or corresponding parts throughout the various views, there is shown in FIG. 1 a shell 10 for a glass electrode incorporating an outer glass tube 12 and an inner glass tube 14 sealed together at their lower ends at 16 and having an ion sensitive bulb 18 sealed to the ends of the tubes. The inner tube 14 has a construction 20 therein for purposes that will appear later.

Figure 2:
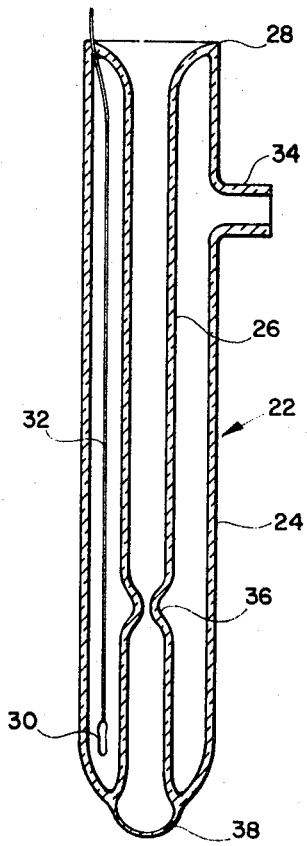
FIG. 2 is a longitudinal sectional view of an additional embodiment of the shell for use in electrochemical electrode assembly of the invention.

FIG. 2 shows a shell 22 for use in a combination glass-reference electrode. This shell also includes an outer tube 24 and an inner tube 26 sealed together by glass ring seal 28 at their upper ends. An internal half-cell 30 is positioned in the annular space between the inner tube 26 and outer tube 24 and has a wire 32 connected thereto which extends through the upper end of the assembly. A port 34 is provided in the outer tube 24 for permitting the space between the tubes to be filled with a suitable electrolyte. The inner tube has a constriction 36 therein and an ion sensitive bulb 38 is sealed to the lower ends of the inner and outer tubes which are also sealed together.

Figure 3:
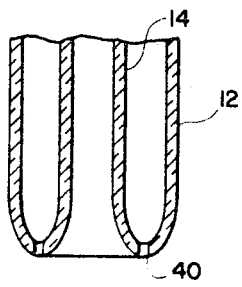
FIG. 3 is a fragmentary view, in section, of the lower portion of a pair of glass tubes, symbolizing the lower portion of either of the assemblies in FIG. 1 or FIG. 2, but without an ion sensitive bulb attached thereto.

The novel feature of the invention is the manner in which the bulbs 18 and 38 in FIGS. 1 and 2, respectively, are attached to the lower ends of the inner and outer tubes of the shells 10 and 22 and how the lower ends of the tube are sealed together. The method of the invention can be best understood by reference to FIGS. 3 to 5, in which FIG. 3 illustrates the inner tube 14 and outer tube 12 mounted in concentric relationship and with their lower ends spaced slightly apart to provide a narrow annular passage 40. Although the tubes in FIGS. 3 to 5 have been designated by numerals 12 and 14, it is to be understood that the structure illustrated in these figures also symbolizes the lower portion of the shell illustrated in FIG. 2 in which the inner and outer tubes are designated by numerals 26 and 24. In the case of the shell illustrated in FIG. 1, the inner tube 14 must be positioned concentric with the outer tube 12 by the use of a tool (not shown) which is inserted through the upper end of the shell and locates the inner tube in the desired position. In the case of the shell illustrated in FIG. 2, the inner tube 26 is initially sealed by the glass ring seal 28 to the outer tube 24 to concentrically position the inner tube in the outer tube. Preferably, the wire 32 is positioned between the inner and outer tubes prior to the forming of the glass ring seal 28 so that the wire will be sealed in the upper end of the shell 22 when the seal 28 is formed by heating the joints of the upper portions of the inner and outer tubes by a flame.

After once positioning the inner tube concentrically in the outer tube with the ends of the tubes adjacent one another, as described above, according to one embodiment of the method of the invention, the lower portion of the assembly shown in FIG. 3 is preferably heated in the flame of a burner to incipient redness, although this step of preheating is not always essential. The hot end of the assembly is then touched evenly to the surface of the molten bath or batch of ion sensitive glass (not shown), care being taken to insure uniform contact with the molten glass about the ends of the tubes and sufficiently deep in the glass so that a ring of glass closes the annular passage 40 between the tubes. Under these circumstances, the molten electrode glass wets the surfaces of the passage 40 and the ends of the tubes 12 and 14, thereby insuring the subsequent formation of glass-to-glass seal of high quality.

Figure 4:
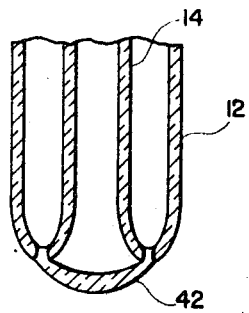
FIG. 4 is the same as FIG. 3 except with a droplet of ion sensitive glass adhered to the bottom of the assembly.

As soon as the end of the glass tube assembly has uniformly contacted the surface of the molten glass and closed the passage 40 with a ring of glass, it is withdrawn and, due to effects of viscosity and surface tension, carries with it a droplet 42 of the molten glass in sealing relationship to the bottom of the tubes as seen in FIG. 4.

Figure 5:
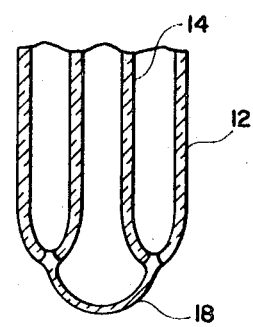
FIG. 5 is the same as FIG. 4 except with the droplet shown blown into the form of a bulb.

Thereafter, the droplet of the glass is permitted to cool to a proper glass-blowing temperature and gas is passed through the upper end of inner tube 14 to expand the droplet 42 in the form of an enlarged bulb 18 as shown in FIG. 5. The method of forming an ion sensitive bulb by dipping a tube in a bath of ion sensitive glass is described in detail in U.S. Patent No. 2,346,470 to Cary et al. It can be seen that by the present invention, in a single step a glass ring is formed which seals the inner and outer tubes 14 and 12 and seals an ion sensitive bulb 18 to the tube assembly, the resulting glass seal being of high quality and capable of withstanding elevated temperatures and pressures.

It is to be understood that in connection with the method illustrated in FIGS. 3 to 5, sufficient ion sensitive glass fills the annular passage 40 as to render the glass non-ion-sensitive, that is, being sufficiently thick as to have high resistance and therefore no longer have ion sensing characteristics as does the bulb 18.

Figure 6:
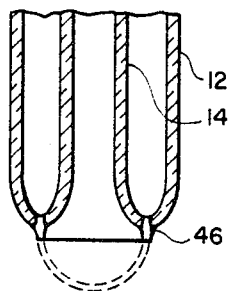
FIG. 6 shows another embodiment of the invention in which grade glass is utilized to seal the bottoms of the inner and outer tubes with the glass having been formed in a bulb and then a portion of the bulb removed to leave a ring of grade glass, the removed portion being shown in phantom lines.
Figure 7:
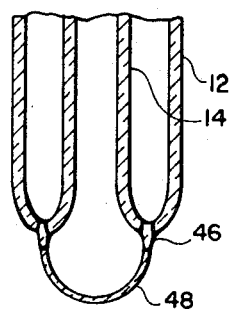
FIG. 7 shows the assembly of FIG. 6 with a bulb of ion sensitive glass attached to the ring of grade glass.

Referring now to FIGS. 6 and 7, there are illustrated steps for forming an ion sensitive bulb on the end of a glass ring seal of grade glass, that is, a glass having a coefficient of thermal expansion intermediate that of the glass of the tubes 12 and 14 and the ion sensitive bulb 18. In this embodiment of the invention, there is first formed a bulb in the same manner as described in connection with FIG. 5 but with grade glass rather than ion sensitive glass. After the bulb of grade glass has been formed, a portion of the bulb is removed leaving a glass ring 46 of grade glass at the end of the tubes 12 and 14 and which seals the ends of the tubes together. The bulb of grade glass may be removed to form the ring 46 by a grinding wheel or the like. Once the ring 46 has been formed, the end of the ring is then dipped in a bath of molten ion sensitive glass, in the manner described above, to form a droplet of the glass across the end of the ring 46. Then, a second bulb 48 is blown on the end of the ring 46, as seen in FIG. 7. This method of forming the ion sensitive bulb on the end of a pair of glass tubes is preferred when the ion sensitive glass is incompatible with the glass of the tubes 12 and 14, in which case the ion sensitive glass would not effectively seal to the ends of the tubes.

Figure 8:
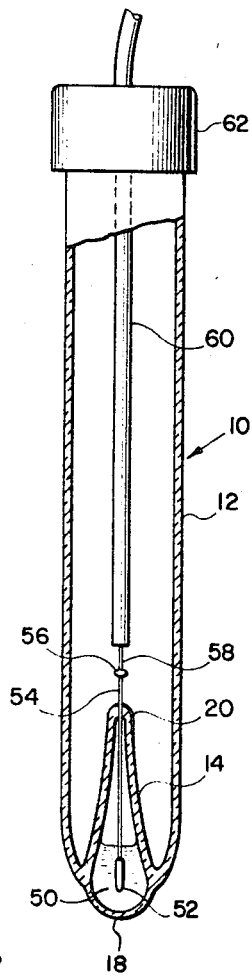
FIG. 8 shows a completed electrode assembly incorporating the shell of FIG. 1.

In FIG. 8 there is illustrated a finished glass electrode incorporating the shell of FIG. 1 having an ion sensitive bulb 18 formed in accordance with the method illustrated in FIGS. 3 to 5. The inner tube 14 and bulb 18 contain an electrolyte 50 in which there is immersed an internal half-cell 52. The half-cell is connected to a platinum wire 54 which extends upwardly through the inner tube and is sealed in the constriction 20 at the end of the tube in accordance with the method described in our patent application entitled, Electrochemical Electrode Assembly and Method of Making Same, Ser. No. 518,247 filed concurrently herewith. The wire 54 is welded at 56 to a conductor 58 of a cable 60 extending through a cap 62 at the upper end of the shell 10.

Figure 9:
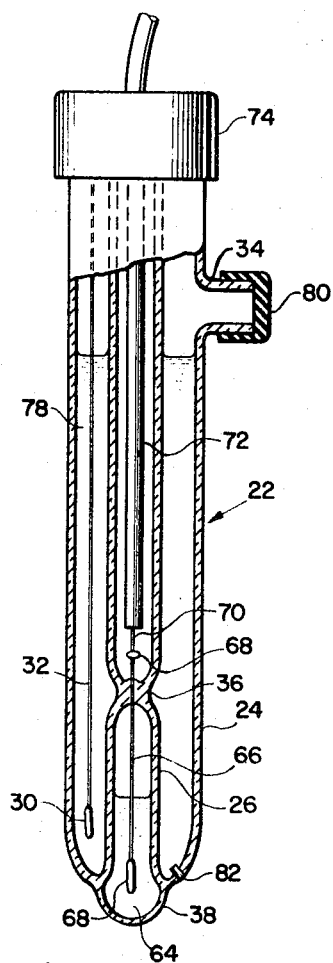
FIG. 9 shows a completed glass-reference electrode assembly incorporating the shell of FIG. 2.

FIG. 9 shows the shell 22 in FIG. 2 assembled into a completed combination glass-reference electrode. As in the electrode illustrated in FIG. 8, the lower portion of the inner tube 26 is filled with an electrolyte 64 and a wire 66 connected to an internal half-cell 68 is sealed into the constriction 36 of the inner tube. The conductor 66 is welded at 68 to a conductor 70 in a cable 72 passing through a cap 74 which closes the upper end of the shell 22. The space between the inner tube 26 and the outer tube 24 is filled through the port 34 with a suitable electrolyte 78, the port being closed by a rubber or plastic cap 80. At the lower end of the outer tube 24, there is provided a liquid junction structure 82 which may be an inert metal wire, asbestos fiber, or the like sealed in the glass tube. It can be readily appreciated that since the ion sensitive bulb 38 is sealed directly to the ends of the inner tube 26 and outer tube 24, the liquid junction structure 82 may be positioned more closely to the ion sensitive bulb than has been possible in prior structures for combination glass-reference electrodes.

Although the invention has been described as utilizing the bulb forming method described in the aforementioned Cary et al. patent, it should be understood that the invention may also be practiced by applying the batch of molten ion sensitive glass to the ends of tubes 12 and 14 on the glass lathe by employing conventional lathe working techniques.

Although several embodiments of the invention have been disclosed herein for purposes of illustration, it will be understood that various changes can be made in the form, details, materials, arrangement and proportions of the various parts in such embodiments without departing from the spirit and scope of the invention as defined by the appended claims.

What is claimed is:

1. In an electrochemical electrode assembly, the combination of:

inner and outer concentric glass tubes with one end of said inner tube terminating adjacent to the corresponding end of said outer tube;

a bulb of ion sensitive glass; and a single glass ring sealing together said ends of said inner and outer tubes and said bulb, said glass ring having a composition different than that of said glass tubes.

2. An electrochemical electrode assembly as set forth in claim 1 wherein said glass ring is formed of the same glass as said ion sensitive glass bulb, said ring being sufficiently thick so as to be non-ion-sensitive.

3. An electrochemical electrode assembly as set forth in claim 1 wherein said glass-ring is formed of a grade glass.

4. A method of making a shell for an electrochemical electrode assembly comprising the steps of:

concentrically positioning a first glass tube within a second glass tube with one end of said first tube closely spaced to one corresponding end of said second tube to define a narrow annular passage between said tubes;

applying a batch of molten ion sensitive glass to said one ends of said tubes to simultaneously close said annular passage with said molten glass and form a droplet of said glass from said batch extending across said one end of said first tube when said one ends of said tubes are removed from said batch;

removing said one ends of said tubes from said batch when the glass of said molten batch has wetted the surfaces of said annular passage and said one end of said first tube to form said droplet of said ion sensitive glass adhering to said one end of said first tube; and blowing said droplet into a bulb.

5. A method of making a shell for an electrochemical electrode assembly comprising the steps of:

concentrically positioning a first glass tube within a second glass tube with one end of said first tube closely spaced to one corresponding end of said second tube to define a narrow annular passage between said tubes;

applying a batch of molten grade glass to said one ends of said tubes to simultaneously close said annular passage with said molten grade glass and form a droplet of said glass from said batch extending across said one end of said first tube when said one ends of said tubes are removed from said batch;

removing said one ends of said tubes from said batch when the grade glass of said molten batch has wetted the surfaces of said annular passage and said one end of said first tube to form said droplet of said grade glass adhering to said one end of said first tube;

blowing said droplet into a bulb;

removing said bulb of grade glass except for a narrow ring of said grade glass adjacent to said one ends of said tubes;

applying a batch of molten ion sensitive glass to the end of said ring of grade glass to form a droplet of said glass from said batch of ion sensitive glass extending across said ring when said ring is removed from said batch;

removing said ring from said batch of ion sensitive glass when the glass of said molten batch has wetted said ring to form a droplet of said ion sensitive glass adhering to said ring; and blowing said droplet of ion sensitive glass into a bulb.

References Cited

UNITED STATES PATENTS

| | | | |
|---|---|---|---|
| 2,117,596 | 5/1938 | Bender et al. | 204—195.1 |
| 2,311,977 | 2/1943 | Coleman | 204—195.1 |
| 2,755,243 | 7/1956 | Beckman et al. | 204—195.1 |
| 3,145,157 | 8/1964 | Arthur et al. | 204—195.1 |
| 3,188,285 | 6/1965 | Watanabe et al. | 204—195 |
| 3,226,313 | 12/1965 | Riseman | 204—195.1 |

FOREIGN PATENTS

| | | |
|---|---|---|
| 667,471 | 3/1952 | Great Britain. |
| 1,090,451 | 10/1960 | Germany. |

JOHN H. MACK, *Primary Examiner.*

T. TUNG, *Assistant Examiner.*

U.S. Cl. X.R.

65—46